United States Patent [19]

Meusy

[11] Patent Number: 4,881,522
[45] Date of Patent: Nov. 21, 1989

[54] METHOD FOR ACTIVATING THE COMBUSTION IN A HEATING APPARATUS USING SOLID FUEL, AND CHIMNEY FOR IMPLEMENTING SUCH METHOD

[76] Inventor: André Meusy, 6, ruelle du Canal, CH-2926 Boncourt, Switzerland

[21] Appl. No.: 96,352
[22] PCT Filed: Nov. 26, 1986
[86] PCT No.: PCT/CH86/00164
§ 371 Date: Aug. 7, 1987
§ 102(e) Date: Aug. 7, 1987
[87] PCT Pub. No.: WO87/03669
PCT Pub. Date: Jun. 18, 1987

[30] Foreign Application Priority Data

Dec. 6, 1985 [FR] France .................. 8518219

[51] Int. Cl.$^4$ ............................. F24B 7/00
[52] U.S. Cl. ....................... 126/540; 126/513; 126/163 R; 126/152 R
[58] Field of Search .......... 126/120, 121, 132, 134, 126/143, 164, 165, 163 R, 152 R, 152 B

[56] References Cited

U.S. PATENT DOCUMENTS

| | | | |
|---|---|---|---|
| 207,362 | 8/1878 | Lester | 126/143 X |
| 376,575 | 1/1888 | Bradford | 126/134 |
| 411,393 | 9/1889 | Peck | 126/134 X |
| 1,465,490 | 8/1923 | Seitz . | |
| 1,977,651 | 10/1934 | Simeral . | |
| 3,289,667 | 12/1966 | Nelson | 126/165 |
| 4,043,313 | 8/1977 | Sherman . | |
| 4,136,666 | 1/1979 | Haas | 126/143 |
| 4,159,801 | 7/1979 | Roland | 126/132 X |
| 4,177,793 | 12/1979 | Johnson | 126/121 |
| 4,213,445 | 7/1980 | Mayo . | |

FOREIGN PATENT DOCUMENTS

| | | |
|---|---|---|
| 3345087 | 6/1985 | Fed. Rep. of Germany . |
| 2542849 | 9/1921 | France . |
| 2473156 | 7/1981 | France . |
| 2515792 | 5/1983 | France . |

*Primary Examiner*—Randall L. Green
*Attorney, Agent, or Firm*—Frost & Jacobs

[57] ABSTRACT

A hearth having an air supply through the bottom, a metal dish arranged at a predetermined height above the bottom and defining an area for preheating combustion air which then flows upwardly around the contour of the dish to form a curtain of preheated air. A belt may be provided surrounding the dish which defines an air inlet slot. The method comprises introducing combustion air into the hearth in the form of a continuous stream to form a continuous ascending air curtain laterally surrounding glowing embers in the hearth. Water or water vapor may be introduced into a zone having a temperauture high enough to decompose the water molecules, thereby locally activating combustion.

7 Claims, 4 Drawing Sheets

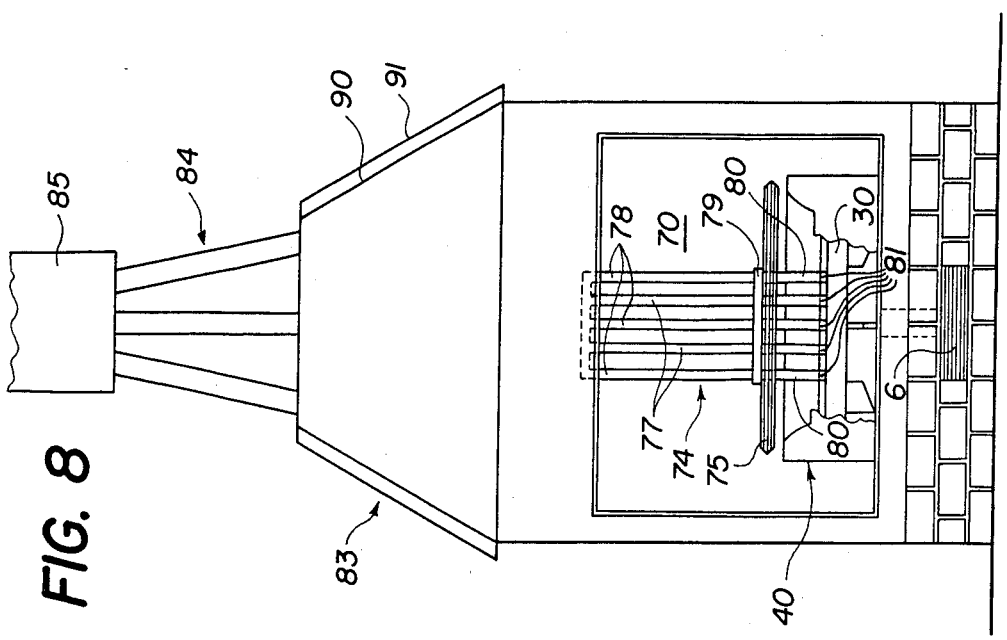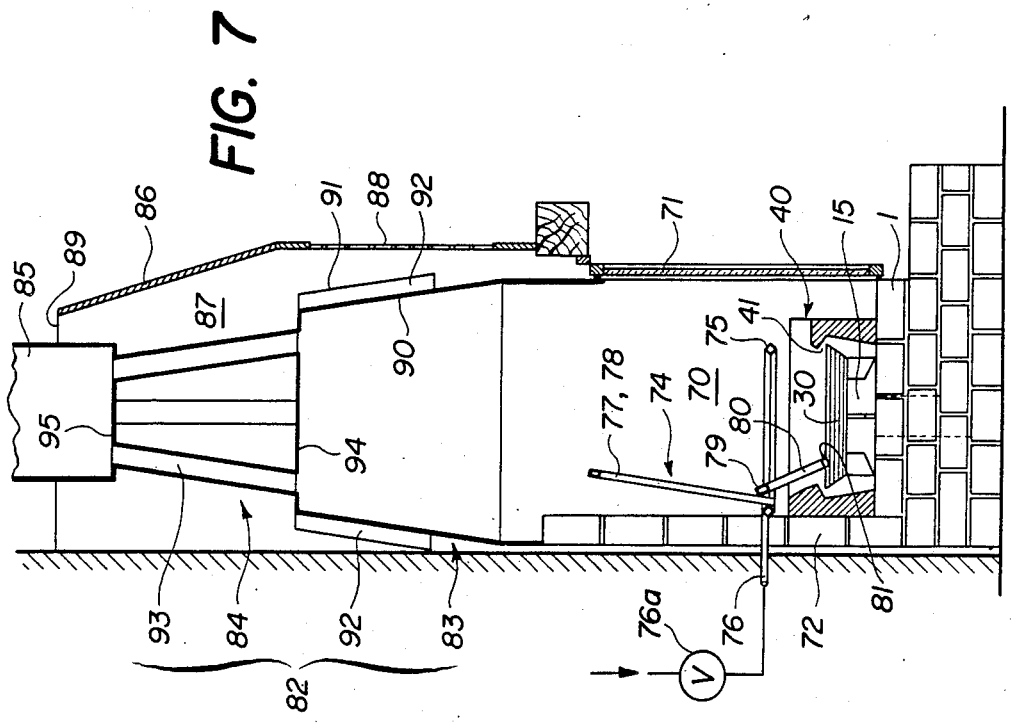

METHOD FOR ACTIVATING THE COMBUSTION IN A HEATING APPARATUS USING SOLID FUEL, AND CHIMNEY FOR IMPLEMENTING SUCH METHOD

The present invention relates to a method for activating combustion in the hearth of a heating apparatus for burning solid fuel, especially wood, wherein the fuel is arranged together to form flowing embers in the hearth of the heating apparatus.

The invention also relates to a hearth fitting for carrying out this method as well as a fireplace comprising such a hearth fitting.

The combustion of solid fuels, especially wood, leads to the generation of gaseous products of which some are combustible, but necessitate a very high temperature for ignition. The same applies to certain solid particles which are carried along with the fumes. In conventional heating equipment, the temperature of the gaseous medium situated above the fuel is often not sufficiently high to cause ignition of these products, which then constitute a fuel that is lost to the atmosphere, harms the environment and represents a loss of energy efficiency of the heating apparatus. From this point of view, known fireplaces are particularly unfavorable, even if they are equipped with means for heat recovery. Such means do not effectively increase the temperature within the fireplace; they on the contrary generally contribute to reducing it by withdrawing heat from the flowing embers.

To avoid this drawback, patent application FR-A-2,515,792 provides for a wood-fired boiler, a fuel support comprising a solid central part in the form of a roof with a slight slope, and two lateral grates with inclined bars allowing the arrival of combustion air along two sides of the glowing embers. However, in spite of this arrangement, air nevertheless penetrates into the glowing embers, over their entire length and it cools them especially as that the fuel tends to spread over the lateral grates. Patent application FR-A-2,473,156 describes another way of introducing combustion air into the hearth of a fireplace. This hearth comprises a non-perforated and elevated metallic bottom which forms a part of a heat recuperator carrying a separate air or water circuit. The combustion air passes underneath this bottom, then in front of it, for introduction into the hearth in the form of a stream rising between the front edge of the bottom and the front opening of the hearth of the fireplace, to prevent the aspiration of air from the room in which the fireplace is located. This hearth moreover does not allow hotter glowing embers to be obtained than in a conventional fireplace with a non-perforated bottom, especially because the air enters into contact with the glowing embers substantially in the same manner. In addition, the bottom of the hearth is cooled by the hear recuperator.

The present invention thus has the object of providing a process and a device allowing activation of the combustion of solid fuel and/or the products which are generated therefrom, by means of an increase of the temperature in a part or the totality of the glowing embers, in order to thus obtain as complete combustion as possible.

To this end, the process according to the invention is characterized in that the air supplied to the combustion is introduced into the hearth in the form of a continuous stream on the entire periphery of the glowing embers to form a continuous ascendant air curtain which laterally surounds the entire glowing embers. The air is preferably introduced into the fireplace by natural draft after having been preheated.

Tests carried out by the inventor show that by introducing the air necessary for combustion in this manner, and not into the heart of the glowing embers, as is conventionally done for example through a fireplace grate, one may obtain in the glowing embers temperatures of the order of 1000° C. This result may be explained by the fact that the ascending air curtain protects the glowing embers against any parasitic air circulation which could cool them, and that the ascending movement of the air curtain determines a certain depression in the glowing embers, which tends to contract the air curtain upwards and to bring air progressively into contact with the combustible products, without there being excess air cooling the gaseous products. The glowing embers are in fact found to have an air deficit, which favors carbonization of the wood, with formation of a great amount of glowing embers.

According to a particularly advantageous development of this process, water or water vapor is introduced into at least one zone of the glowing embers having a temperature greater than 900° C., to obtain decomposition of the water molecules. One thus produces a phenomenon known in the gas industry, for the production of so called "blue water gas" from coke. The water vapor molecules are dissociated and combined endothermally with the carbon of the fuel, according to the following two reactions, reaction I being the principal one:

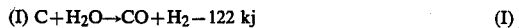

(I) $C + H_2O \rightarrow CO + H_2 - 122$ kj  (I)

(II) $C + 2H_2O \rightarrow CO_2 + 2H_2 - 80$ kj  (II)

The gaseous mixtures thus produced mainly include hydrogen and carbon monoxide which are combustible and will be completely burnt higher up in the hearth, when they enter into contact with the air curtain surrounding the glowing embers. This combustion provides a heat which is much greater than the heat absorbed by the reactions I and II and it produces very hot flames in the heart of the hearth, above the glowing embers. In addition to an intense thermal radiation, one obtains pricipally a very complete combustion of the gaseous products which are generated by vaporization, as well as the hydrocarbons which may have been formed in the presence of hydrogen. The solid particles which are carried off by the gases are likewise completely burnt. Consequently, the gases leaving the hearth are perfectly oxidized, contain very little soot and do not cause tar deposits.

Said water vapor is preferably overheated by exposure to the thermal radiation of the glowing embers, in a conduit disposed within the hearth, but outside the air curtain. In this way, the heat absorbed by vaporization of the water and by the reactions I and II is drawn from outside the glowing embers. As soon as the fire radiates sufficient heat, the end part of the vapor conduit may attain a temperature of the order of 900° to 1000° C. at which the water molecules are cracked, whereby an extremely inflammable gaseoeus mixture is injected into the glowing embers, which particularly allows fuel of low quality to be burnt.

To carry out the process set forth above, the present invention firstly provides a hearth fitting, characterized in that it includes a metallic fuel support in the form of a dish with raised edges, and support elements for maintaining this dish at a given height above an air admission, opening underneath the dish and for defining a zone for preheating combustion air. Said support elements are preferably metallic ribs solid with the lower face of the dish and extending in the preheating zone in such a manner as to distribute the air over the entire periphery of the dish.

According to an advantageous embodiment, the hearth fitting comprises a belt laterally surrounding the dish and the preheating zone, this belt being disposed in such a manner as to define with the edge of the dish an air admission slit extending over the entire periphery of the dish, for the passage of air coming from the preheating zone.

This belt preferably extends upwards to a level higher than the edge of the dish and has a concave transversal profile opposite said edge, so as to direct air issuing from the admission slit above the dish. This belt may include refractory brick elements.

The present invention also relates to a fireplace comprising a hearth fitting of the above mentioned type. Such a fireplace is characterized in that it includes a combustion air circuit comprising successively at least one air supply conduit, an air preheating zone under the metallic dish and an air admission slit extending over the entire periphery of this dish. This fireplace may include means for guiding air near the air injection slit, these means being disposed opposite the edge of the dish.

In an advantageous embodiment, wherein the process of injecting water decomposed at high temperature is utilized, the fireplace includes a water reactor connected to a water supply source equipped with flow control means, said reactor comprising at least one metallic tubular conduit disposed in the hearth so as to be exposed to the thermal radiation produced by combustion, and injection nozzles connected to this conduit and disposed near the glowing embers. Such a reactor may comprise at least one bottom tube forming a loop around the lower part of the hearth, and a group of upper tubes which comprises ascending tubes, connected to the bottom tube, and descending tubes connected to the injection nozzles. The bottom tube of the reactor is preferably disposed above the belt laterally surrounding the dish.

To transmit to the ambient air the increased heat resulting from combustion, the fireplace may include above the hearth a heat exchanger comprising a first metallic jacket enclosing the combustion gases, and a second jacket forming around the first jacket an ascending air conduit open at the bottom and at the top, the fireplace further including an outer casing surrounding this heat exchanger, and provided with air inlet and outlet openings. The outer casing is preferably located at a distance from the second jacket and the inlet openings of the outer casing extend at least partially opposite the second jacket. The heat exchanger may likewise include, in its upper part, a set of metallic tubes for the passage of combustion gases, the conduit formed between the first and second jackets being convergent in the direction of these tubes.

The present invention may be better understood by the description of various embodiments, given below by way of example and with reference to the accompanying drawings wherein:

FIG. 7 is a vertical sectional view of a fireplace according to the present invention, and FIG. 8 is a front view of the fireplace of FIG. 7, after removal of its outer casing.

Figure 1:
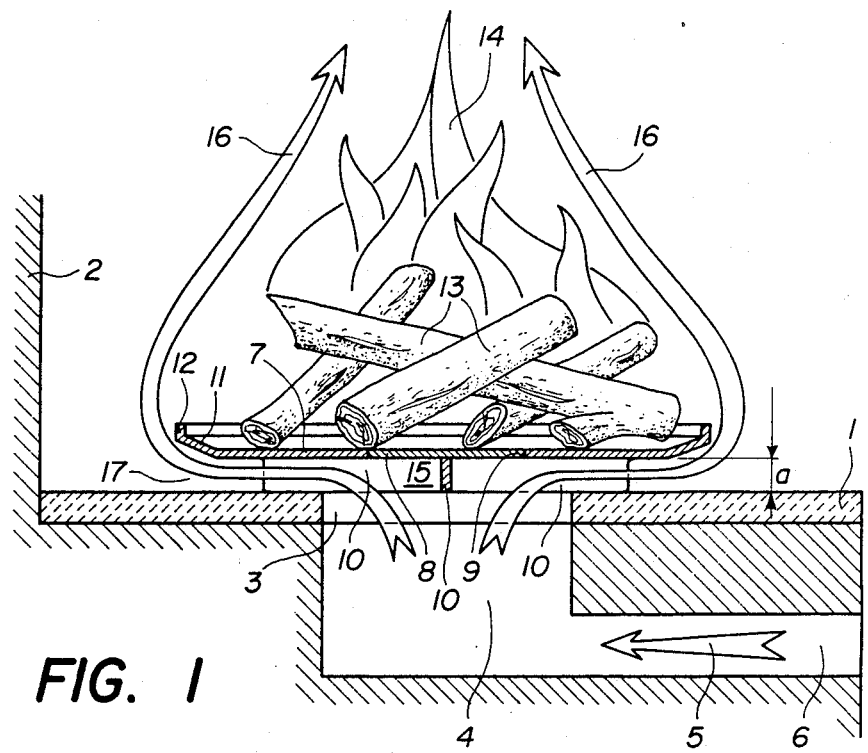
FIG. 1 is a partial vertical sectional view of a fireplace hearth equipped with a fitting consisting of a metallic dish.

The fireplace hearth represented schematically in FIG. 1 comprises a bottom 1 and a rear wall 2. The bottom 1 is pierced with an opening 3 communicating with an ashbox 4. Combustion air 5 is brought to the ashbox 4 by a supply conduit 6, from the room to be heated or from the exterior of the building, then this air is directed upwards to the interior of the hearth.

Figure 2:
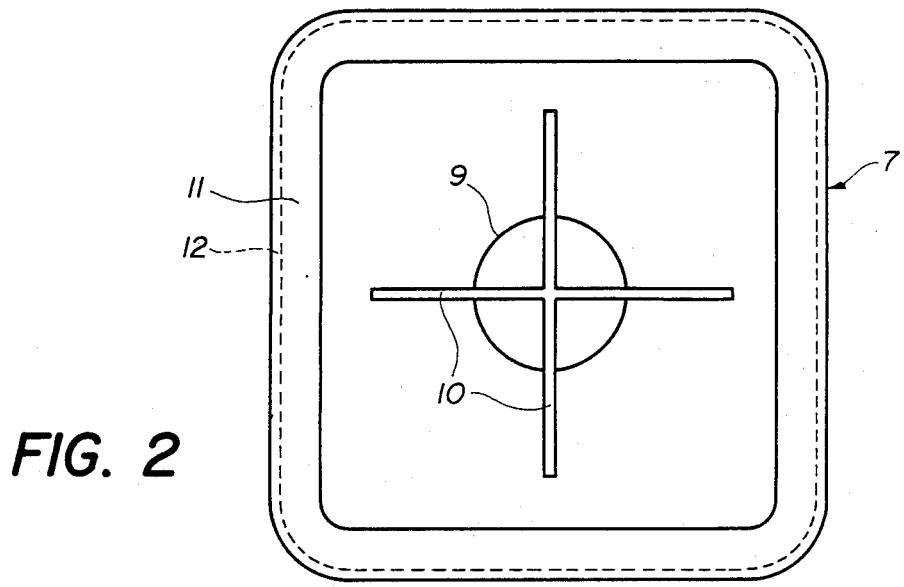
FIG. 2 is a view of the lower face of the dish shown in FIG. 1.

A metallic dish 7 of cast iron or steel sheeting is disposed at a given height (a) above the bottom of the hearth, above the opening 3, opposite which the dish 7 includes a central opening 9 for discharging the ash, this opening being closed off by a removable cover 8. As is shown in FIG. 2, the lower face of the dish 7 is provided with four crossribs 10 which support the dish while resting on the bottom 1. On the other hand, the edge of the dish presents in cross-section an upwardly concave profile, with an inclined section 11 and a vertical section 12.

Although the dish 7 represented here presents a square shape in plan view, it might likewise have a circular form or any other appropriate form.

The dish 7 constitutes a hearth fitting which operates as follows. The fuel 13, formed of firewood in the present instance, is disposed on the dish 7 and ignited. The resulting ascending flames 14 induce by natural draft an intake of air which causes a slight depression in the space 15 situated between the dish 7 and the bottom 1, as well as in the supply conduit 6. The fresh air 5 flowing radially underneath the dish 7 is preheated by contact with the dish and the ribs 10, and then goes round the edge of the dish and forms a continuous curtain of preheated air 16 which surrounds the flames 14 and the combustion zone situated above the dish.

In this way, the combustion zone is supplied with preheated air at its periphery and is protected against any sweeping with cold air. The fuel as well as the gases and fumes given off therefrom reach a high temperature which promotes both the draft of the fireplace and very complete combustion, that is to say a reduction of the amount of smoke and soot. The efficiency of the fireplace is thereby increased and it may be further improved by a heat exchanger disposed above the combustion zone. The flames of the combustion gases are retained within the air curtain, which reduces the deposit of soot in the hearth. The glowing embers in the dish are protected from the air current and thus remain very hot. One may already obtain with a very simple dish of this type, temperatures of the order of 1000° C. in the glowing embers, hence a decomposition of the water which is enclosed in a humid fuel. The hydrogen and oxygen thus liberated are combined once more further up in the hearth while producing spectacular and very hot flames which contribute to the combustion of the still unburnt gaseous products.

The inclined form of the edge 11 of the dish 7 defines an air passage 17 which is enlarged at the outlet of the preheating zone 15 and which avoids turbulence around the edge of the dish so as to obtain an air curtain which is as uniform as possible.

The dish 7 described above may also be utilized in a fireplace whose bottom is not provided with an air supply conduit. One simply places between the dish 7 and the bottom of the hearth a complementary metallic part forming an air supply conduit up to the center of the dish. It should be noted that the hearth fittings such as described above may be very easily installed in an existing fireplace with a view to improving its efficiency. This fireplace may function either with a closed hearth or with an open hearth.

Figure 3:
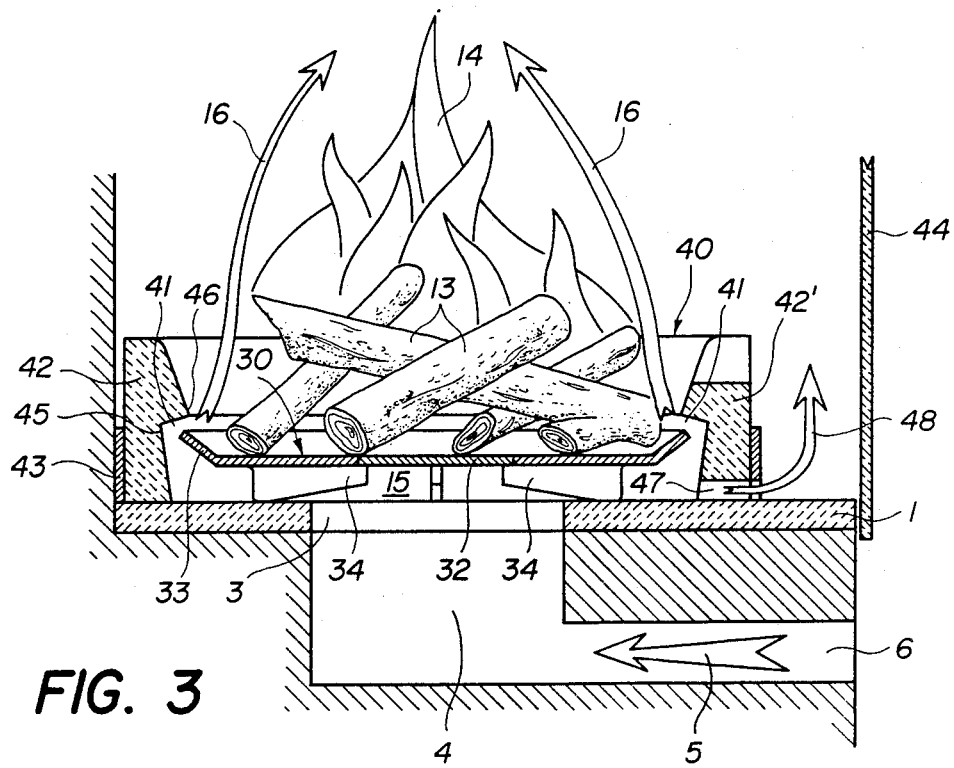
FIG. 3 is a vertical sectional view similar to FIG. 1 and represents another embodiment.
Figure 4:
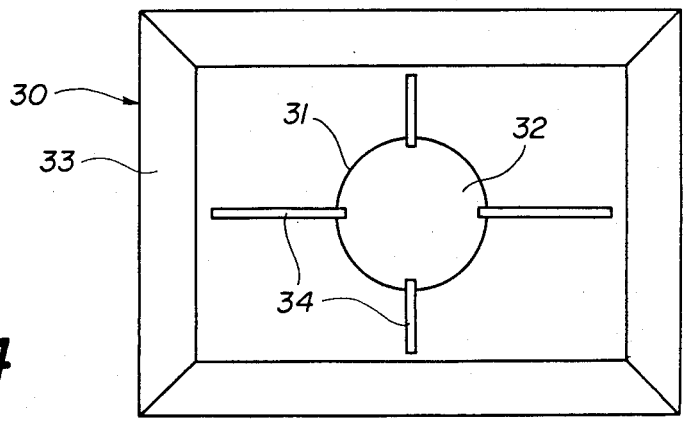
FIG. 4 is a view of the lower face of the dish represented in FIG. 3.

FIGS. 3 and 4 show a fireplace equipped with a hearth fitting comprising a metallic dish 30 which is slightly different from the dish 7 described above, but which functions in a similar manner. The dish 30 is rectangular and is made of steel sheeting in a very simple manner, with a flat bottom provided with a central opening 31 closed off by a cover 32, and an inclined edge 33. The ribs 34 welded under the dish constitute on one hand support elements for the dish and the cover 32 and on other hand heat exchange surfaces in the preheating zone 15 of the combustion air. It also serves to distribute the air over the entire periphery of the dish.

The hearth fitting further comprises a belt 40 which laterally surrounds the dish 30 and which defines around the edge 33 of this dish an air injection slit 41 extending over the entire periphery of the dish. In the example represented here, the belt 40 is formed of profiled elements 42 of refractory material, the stability of these elements being ensured by a metallic frame 43. This belt is simply placed on the bottom 1 of the hearth. It is preferably applied against the rear wall 2 of the hearth, while it may if necessary be located at a certain distance from the lateral walls and from a front door 44 of the hearth.

As is shown in FIG. 3, the elements 42 of the belt have oposite the edge 33 of the dish a concave transversal profile formed here by a reentrant angle 45. This profile is effective to direct above the dish the air coming out of the injection slit 41. In addition, the elements 42 have a projecting edge 46 which extends above the edge of the dish so as to prevent fragments of fuel from falling into the slit 41.

The operating principle of the hearth fitting consisting of the dish 30 and the belt 40 is essentially similar to that which has been described above for the dish 7, but the injection slit 41 defined by the belt 40 permits on one hand air to be directed near to the combustion zone, and on the other hand, a quite uniform distribution of the air curtain 16 injected around the dish to be obtained, independently of the dimensions and the conditions of ventilation of the fireplace. Of course, the dish and the belt may have in horizontal projection a form which is not rectangular, for example a trapezoidal form adapted to the dimensions of the fireplace hearth.

FIG. 3 also shows that the front part of the belt 40, situated along the glass door 44, is formed of one or several refractory elements 42' which are lower then the others, in order that the fire may be better visible, and which include at their lower part an opening in the form of a slit 47 by which an air stream 48 may escape from the preheating zone 15 and sweep the lower parts of the hearth situated outside the belt 40. It has been established that this sweeping action makes it possible to avoid the presence of smoke, and/or turbulence in these zones of the hearth.

Figure 5:
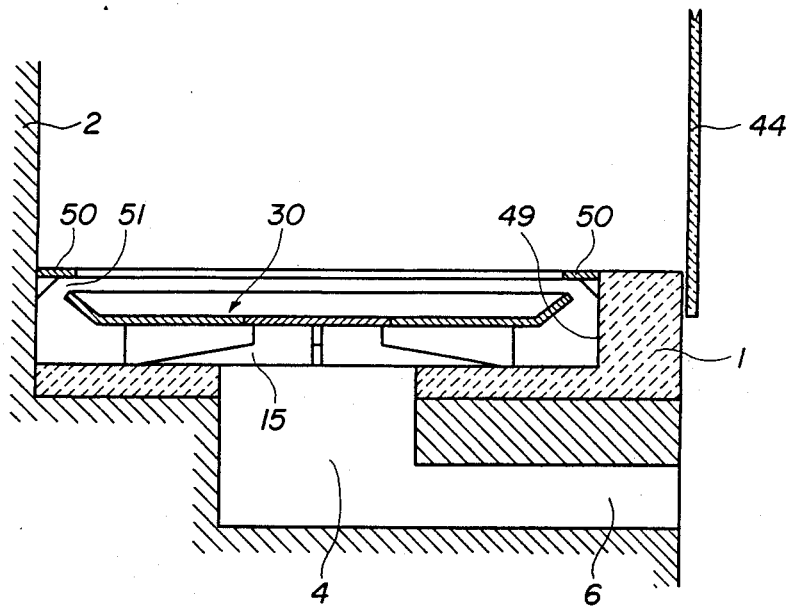
FIG. 5 is a partial vertical sectional view of a fireplace hearth arranged to receive the dish represented in FIG. 3.

FIG. 5 illustrates another embodiment in which the bottom 1 of the fireplace hearth comprises a recess 49 arranged to receive the dish 30 described above. On its periphery, the upper edge of the recess 49 is provided with a belt 50 consisting for example of removable metallic frame which slightly overlies the edge of the dish 30 and which defines along this edge an air injection slit 51. The lower face of the belt 50 may have an inclined or curved surface to direct the air above the dish 30.

Figure 6:
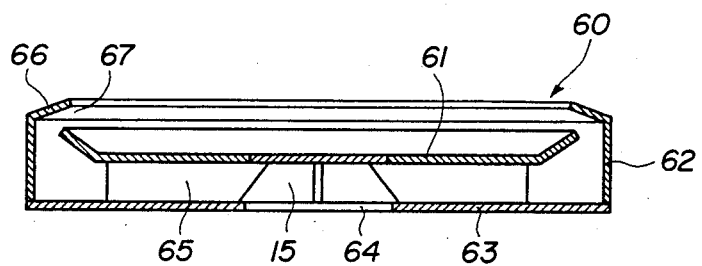
FIG. 6 is a vertical sectional view of another embodiment of a fireplace fitting according the invention.

FIG. 6 shows an embodiment of a hearth fitting which consists of a single piece 60 of welded sheeting, comprising a dish 61 having the same shape as the dish 30 described above, a metallic belt 62 which laterally surrounds the dish 61, and a flat bottom 63 which is provided with a central opening 64 and is fixed to the bottom of the dish 61 by ribs 65. Thus, the dish 61 and the bottom 63 define a preheating zone 15 for the combustion air. In addition, the belt 62 is provided with an inclined upper rim 66 which overlies the edge of the dish and which defines the air injection slit 67. The hearth fitting 60 may be utilized in the same manner as the fittings represented in FIG. 1 or 3, while providing similar advantages.

The fireplace represented in FIGS. 7 and 8 comprises a hearth 70 having substantially the same configuration as that which is schematically represented in FIG. 3. This hearth comprises a flat bottom 1 under which an air supply conduit 6 is provided which encloses an ashbox which opens into the hearth through the bottom 1. The hearth 70 comprises a translucent door 71, which opens while sliding upwards, and a hearth fitting comprising the dish 30 and the belt of refractory material 40 described with reference to FIG. 3. As in the previous cases, these elements define an air preheating zone 15 underneath the dish 30 and a slit 41 for the admission of air over the periphery of the dish. The belt 40 is backed against a lining 72 forming the rear wall of the hearth 70, while it is located at a certain distance from the two lateral walls of the hearth.

In addition to this fitting already described, the hearth 70 is equipped with a water reactor 71 formed of a set of steel tubes disposed above the hearth fitting. This set comprises a bottom tube 75 which forms a rectangular loop above the belt 40 and whose inlet is connected, by a small conduit 76 passing through the rear wall of the hearth, to a water supply equipped with a valve or a flow regulator 76a. The outlet of the base tube 75 is connected to two upper ascending tubes 75 disposed in the front of the rear wall 72 of the hearth, the upper extremeties of these tubes being connected by a transversal tube to three upper descending tubes 78 parallel to the tubes 77. These descending tubes 78 open into a horizontal collector 79 to which several injection nozzles 80 are connected which are formed of steel tubes, each including one or several outlet orifices 81 in the zone of the glowing embers, above the dish 30.

The reactor 74 operates as follows. When the fuel burns on the dish 30, a slight flow of water is admitted into the reactor 74 by the conduit 76, preferably by establishing drop by drop flow by means of the control device. This slight water flow is vaporized very rapidly in the bottom tube 75, then this vapor is overheated in the circuit formed of this tube and of the upper tube 77 and 78 exposed to the heat produced by the glowing embers, principally thanks to their thermal radiation. It has to be noted that these tubes are located entirely inside the ascending air curtain issuing from the slit 41. The vapor circulates due to its expansion and, once it arrives at the nozzles 80 which extend in a very hot zone of the glowing embers above the dish 30, it attains a temperature greater than 900° C. and is decomposed to a gaseous mixture of hydrogen and oxygen which is injected into the glowing embers near the fuel.

It is observed that this considerably activates the combustion in the upper part of the glowing embers and generates, within the air curtain surrounding it, bluish flames which radiate much heat. One thus obtains fumes having undergone very complete combustion at a very high temperature, and in particular a quasi total oxidation by contact with the air curtain surrounding them. In a fireplace utilizing the process according to the present invention, one has measured carbon monoxide contents of the order of 0.02% in the fumes, which may be considered extremely low and indicates complete combustion.

To recover a significant amount of heat from these very hot fumes, the fireplace comprises above the hearth 70 a heat exchanger 82 comprising two superposed parts, namely a hood 83 converging upwards, and a tube exchanger 84, the top of which is connected to a fume discharge conduit 85. An outer casing 86 forms the apparent covering of the fireplace and defines around the hearth and the heat exchanger an enclosure 87 in which ambient air from the room may be heated and circulate by convection. To this end, the casing 86 comprises lateral inlet openings (not shown) at the level of the bottom of the hearth, a large end opening 88 covered with a perforated plate, as well as one or several outlet openings 89 in its upper part.

The hood 83 comprises a first metallic jacket 90 which encloses the combustion gases and supports the upper part of the exchanger and a second metallic jacket 91 fixed at a certain distance from the outer face of the jacket 90 to define an ascending air conduit 92 having a uniform depth of 8 centimeters for example and a width which decreases upwards. The second jacket 92 extends at least partially opposite the front opening 88 of the casing in order to reduce thermal radiation through this opening.

The tube exchanger 84 consists of a crown of converging metallic tubes 93 whose ends are welded to two respective metallic plates 94 and 95 provided with openings corresponding to the tubes. The tubes 93 conduct the fumes from the hood 83 to the discharge conduit 85.

The operation of the heat exchanger 82 is clearly apparent from FIGS. 7 and 8. The ambient air entering into the casing by the lateral inlet openings is heated by contact with the walls of the hearth and rises up to the level of the exchanger 82, where it is mixed with air entering by the front opening 88. A part of this air passes into the ascending conduit 92, and is heated by contact with the very hot first jacket 90. This air is accelerated due to the converging form of the conduit 92 and it is projected towards the tubes 93 of the tube exchanger 84, while carrying along with it air which has passed outside the enclosure 91. This creates in the tube exchanger 84 a rapid circulation of air, thereby increasing the exchange of heat.

Thanks to this construction, the fireplace according to the invention heats the room relatively little by radiation, but essentially by the convection of ambient air. Thanks to the particular form of the heat exchanger, the casing 86 and the perforated plate covering its front opening 88 are heated very little, which is felt as a gain of comfort with respect to conventional casings. It will be noted in this connection that the second jacket 91 of the hood plays an essential role, while the tube exchanger only constitutes an accessory element having the object of raising the thermal efficiency.

While the preceding description refers to fireplaces in which essentially wood is burnt, it may be noted that the process according to the present invention may also be utilized in other types of heating apparatus, for example a domestic stove or a central heating boiler, and/or with other solid fuels, such as coal or derivative products, lignite based briquettes or wood or paper waste, etc. In addition, the described device above may be the object of various modifications or variants obvious to a person skilled in the art, without departing from the framework of the present invention.

I claim:

1. A fireplace hearth fitting for activating combustion for burning solid fuel, including a metallic support in the form of a dish having a raised free edge which is continuous along the whole periphery of said dish, and support elements for maintaining said dish at a predetermined height, and an air emission opening underneath said dish defining under the dish a preheating zone for combustion air, said combustion air flowing from said preheating zone upwardly along said raised free edge as a substantially continuous stream over the whole periphery of said dish, including a belt laterally surrounding said dish and said preheating zone, said belt being disposed in such manner as to define with the edge of the dish an air emission slit extending over the entire periphery of the dish, for the passage of air coming from said preheating zone.

2. Fitting according to claim 1, wherein said support elements are metallic ribs solid with the bottom face of said dish and extending in said preheating zone in such a manner as to distribute air over the entire periphery of the dish.

3. Fitting according to claim 1, wherein said belt extends upwardly to a higher level than the edge of said dish and presents opposite this edge a concave transverse profile, so as to direct above said dish the air coming out of said admission slit.

4. A fireplace including a hearth fitting according to claim 1, said fireplace including a combustion air circuit comprising successively at least one air supply conduit, an air preheating zone underneath said dish, an air admission slit extending around the entire periphery of said dish, and air guide means near said admission slit, said guide means being disposed opposite an edge of said dish.

5. Fireplace according to claim 4, including a water reactor, a water supply source connected to said reactor and equipped with flow control means, said reactor comprising at least one metallic tubular conduit disposed in said hearth so as to be exposed to thermal radiation produced by combustion, and injection nozzles connected to said conduit and disposed near said glowing embers generated from the burning of solid fuel.

6. Fireplace according to claim 5, wherein said reactor includes at least one bottom tube forming a loop around a lower part of said hearth, and a group of upper tubes comprising ascending tubes connected to said bottom tube and descending tubes connected to said injection nozzles.

7. Fireplace according to claim 6, wherein said bottom tube of said reactor is disposed above said belt laterally surrounding said dish.

* * * * *